UNITED STATES PATENT OFFICE.

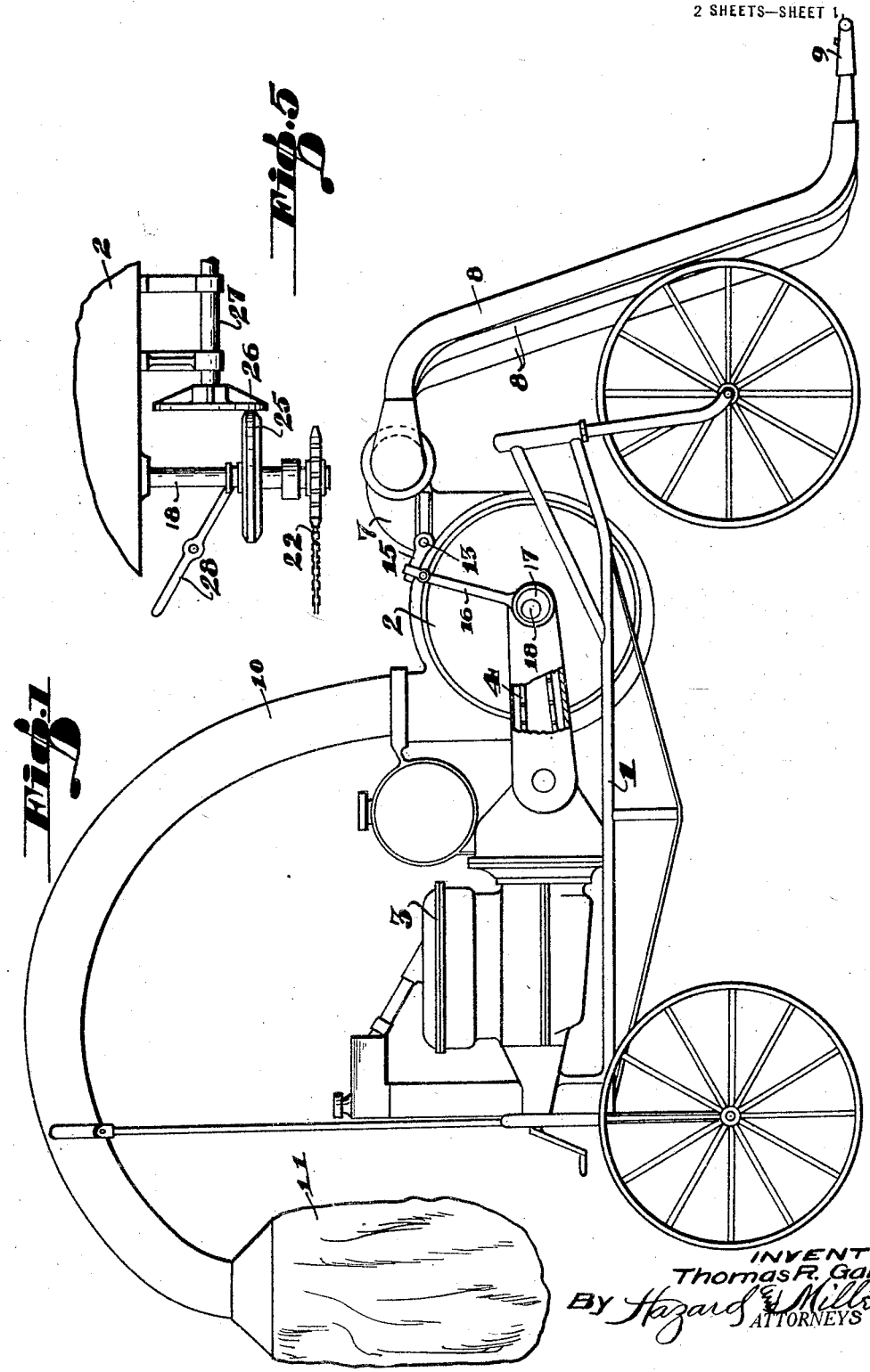

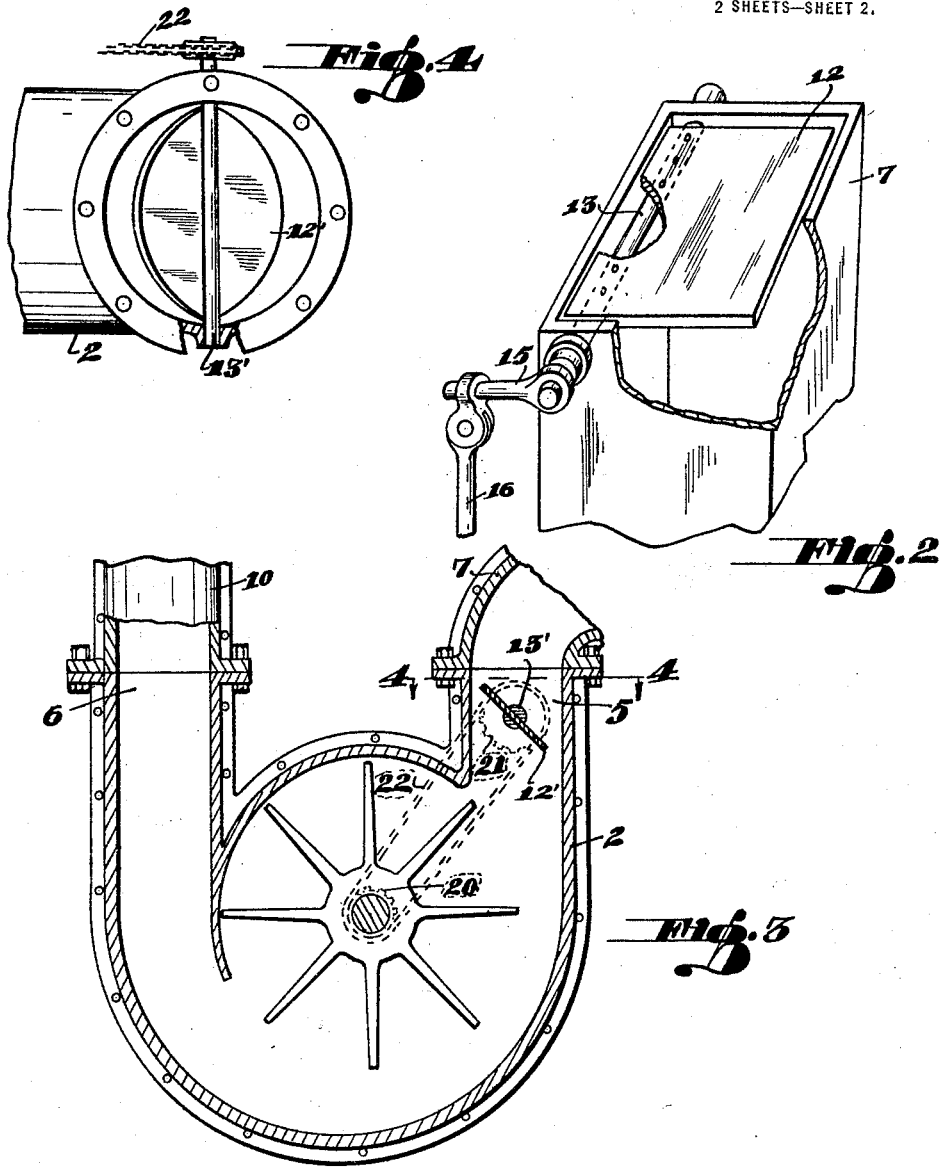

THOMAS R. GABEL, OF LOS ANGELES, CALIFORNIA.

ATTACHMENT FOR COTTON-PICKING MACHINES.

1,411,568. Specification of Letters Patent. Patented Apr. 4, 1922.

Application filed July 2, 1920. Serial No. 393,527.

*To all whom it may concern:*

Be it known that I, THOMAS R. GABEL, a citizen of the United States, residing at Los Angeles, in the county of Los Angeles and State of California, have invented new and useful Improvements in Attachments for Cotton-Picking Machines, of which the following is a specification.

This invention is an attachment for cotton picking machines and has for its object the provision of a device arranged for automatically periodically starting and stopping the suction through the picking nozzle of a machine arranged for picking cotton by the creation of a suction through the picking nozzle and a conduit leading to a suitable bag or the like.

The invention will be readily understood from the following description of the accompanying drawings, in which Figure 1 is a side elevation of a cotton picking machine having a pulsometer employed in connection therewith constructed in accordance with the invention.

Fig. 2 is a perspective view of the pulsometer shown in Fig. 1.

Fig. 3 is a section through a portion of a cotton picking machine, showing a modified form of pulsometer.

Fig. 4 is a transverse section on the line 4—4 of Fig. 3.

Fig. 5 is a fragmentary plan view of a modified form of actuating mechanism for the pulsometer, arranged to permit adjustment of the pulsations thereof.

In the drawings a cotton picking machine is shown having the improved attachment applied thereto, said machine being shown as comprising a wheeled frame 1 having the blower 2 mounted thereon, said blower being driven by the engine 3 as through the sprocket chain connection 4. The suction intake port of the blower is shown at 5, and the discharge port is shown at 6. A suitable conduit 7 leads from the port 5 and communicates with a plurality of hoses 8, each of which is provided with a picking nozzle 9 adapted to be positioned over a cotton boll for drawing the cotton from the boll into the blower by the suction created through the apparatus. The discharge port 6 is connected by a conduit 10 to a suitable receptacle such as a sack 11 adapted to be secured over the outlet of the conduit.

In order to draw the cotton from the bolls, a pulsating suction is provided through the picking nozzles as by periodically shutting off conduit 7.

In the exemplification of the invention illustrated in Fig. 2, the means provided for automatically shutting off the conduit 7 is shown as a gate 12 secured to a shaft 13 extending across the conduit and journaled therein, so that when said shaft is rocked the gate will be swung from a position closing said conduit to a position opening the passage through the conduit. The means employed for rocking the shaft 13 and thus periodically opening and closing conduit 7 may include a laterally projecting arm 15 fixed upon the end of shaft 13 and connected to a connecting rod 16 provided upon an eccentric 17 which may be rotatably positioned upon the shaft 18 of the blower 2. By this arrangement it will be seen that when the machine is in operation and the blower is rotated the shaft 13 will be rocked through the driving connection, thus described, for causing the desired pulsations in the suction through the picking nozzles of the machine.

In the modification of the invention illustrated in Figs. 3 and 4, the shaft 13' upon which is mounted the gate 12' is, preferably, adapted to be completely rotated for causing opening and closing of conduit 7. As an instance of this arrangement the shaft is connected to the gate 12' along the medial line thereof, and a driving connection arranged to cause rotation of shaft 13' is provided, said driving connection being shown as comprising sprockets 20 and 21 fixed upon the blower shaft and upon shaft 13' respectively with a sprocket chain 22 forming a driving connection between said sprockets. Thus it will be seen that the rotation of the blower during operation of the machine is arranged to cause rotation of gate 12' for automatically starting and stopping the suction through the machine, as previously described.

In Fig. 5 I have shown mechanism which may be employed in connection with the attachment shown in either Figs. 1 or 3 adapted to permit of the ready adjustment of the pulsations of the mechanism. This is accomplished by varying the speed of the drive shaft for actuating either connecting rod 16 or sprocket chain 22, so that the speed at which gate 12 or 12' turns will be accordingly varied. As an instance of this arrangement the shaft 18 of blower 2 may be provided with a friction disc 25 adapted to engage a friction disc 26 mounted upon a counter shaft 27. The disc 25 may be shifted radially relative to disc 26 as through a lever 28, for varying the speed of rotation imparted to disc 26 and counter shaft 27, in usual manner. Either the eccentric 17 or sprocket wheel 20 may be mounted upon counter shaft 27, depending upon which of the pulsometers previously described is to be employed. It will thus be seen that the turning movement of the pulsometer may be varied in speed, as described, so as to cause variations in the pulsations of the machine.

Various changes may be made without departing from the spirit of the invention as claimed.

What is claimed is:

A machine of the character described comprising suction creating means, means for continuously causing pulsations in said suction during actuation of the machine, and means for adjusting the frequency of said pulsations with relation to the suction creating means.

In testimony whereof I have signed my name to this specification.

THOMAS R. GABEL.